May 1, 1928.

A. A. GORDON 1,668,146

BOX MOTION FOR LOOMS

Filed April 29, 1926    4 Sheets-Sheet 1

Inventor
Albert A. Gordon
Attorneys

May 1, 1928.

A. A. GORDON

BOX MOTION FOR LOOMS

Filed April 29, 1926

1,668,146

4 Sheets-Sheet 2

Inventor
Albert A. Gordon

Attorneys

May 1, 1928.  
A. A. GORDON  
1,668,146  
BOX MOTION FOR LOOMS  
Filed April 29, 1926 4 Sheets-Sheet 3

Inventor  
Albert A. Gordon  
Southgate Fay & Hanky  
Attorneys

May 1, 1928.  
A. A. GORDON  
1,668,146  
BOX MOTION FOR LOOMS  
Filed April 29, 1926  4 Sheets-Sheet 4

Inventor  
Albert A. Gordon  
Attorneys

Patented May 1, 1928.

1,668,146

UNITED STATES PATENT OFFICE.

ALBERT A. GORDON, OF WORCESTER, MASSACHUSETTS, ASSIGNOR TO CROMPTON & KNOWLES LOOM WORKS, OF WORCESTER, MASSACHUSETTS, A CORPORATION OF MASSACHUSETTS.

BOX MOTION FOR LOOMS.

Application filed April 29, 1926. Serial No. 105,593.

This invention relates to improvements in loom box motions and it is the general object of the invention to provide an improved motion which can be made self-oiling by the use of an oil box or case.

Box motions for looms usually employ a regularly moving part and in addition employ also other parts which are moved only when a change in the active shuttle is required. It is an important object of my invention to place the other parts above the regularly moving part and cause portions of the latter to dip into the oil of the oil well.

In box motions of the Crompton type there is usually provided a master gear having a plurality of angularly spaced segments of gear teeth which cooperate with pinions to raise and lower the box lever. The pinions have associated therewith sliding teeth which are controlled by levers and it is a further object of my invention to dispose the levers and sliding teeth in such a way that the lifter rods for said levers will be out of the plane of the segments so that as the latter rotates oil will not be splashed through the holes provided in the top of the case for said rods.

Box motions of the type specified are provided with upwardly extending links which are attached to the box lever and it is a further object of my invention to provide a cover which engages the case along the line of the links, thereby facilitating removal of the cover without disturbing the box motion.

It is a still further object of my invention to provide a cam and lever to cooperate with the spring stressed locking levers usually employed to position the pinions, said cam and lever moving regularly into the oil to be lubricated.

It is a further object of my invention to provide an oil case into which the one end of the bottom shaft of the loom extends, the side of the box or case adjacent the loom side being formed with a bearing thereon for the bottom shaft.

With these and other objects in view which will appear as the description proceeds, my invention resides in the combination and arrangement of parts hereinafter described and set forth in the claims.

Figure 1:
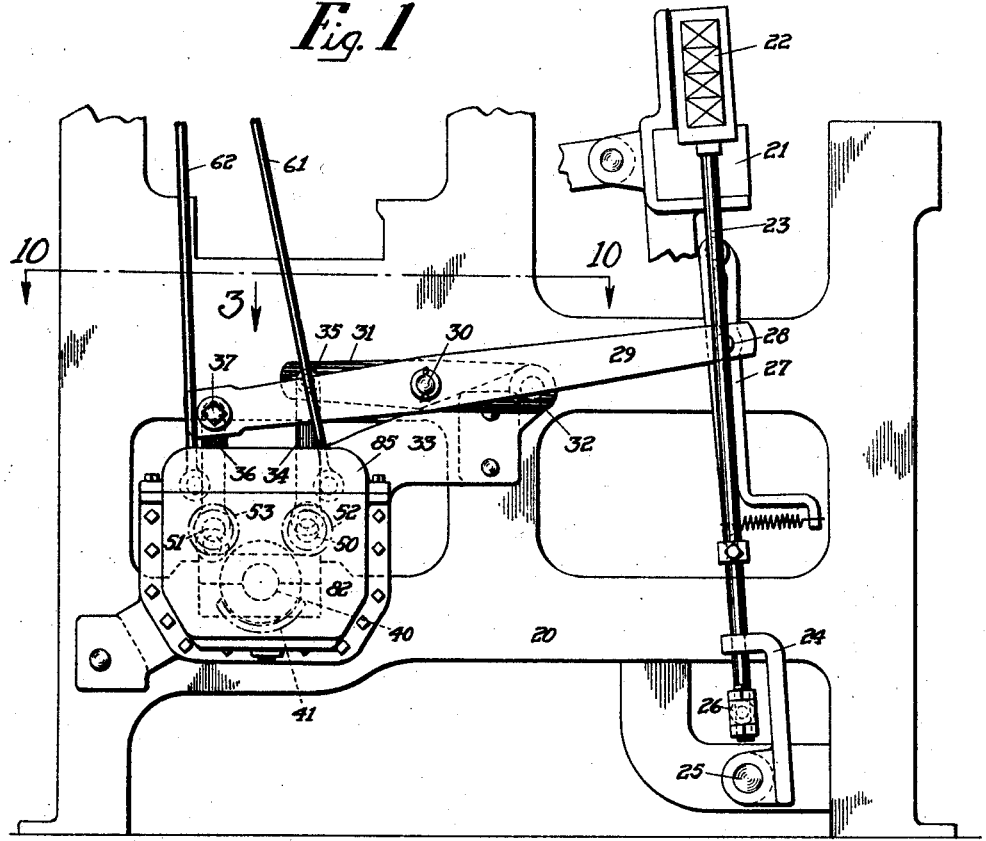
Figures 7, 8, 9:
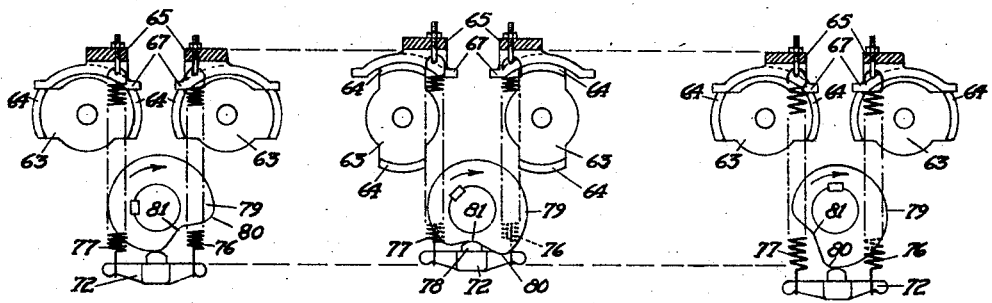
Figure 2:
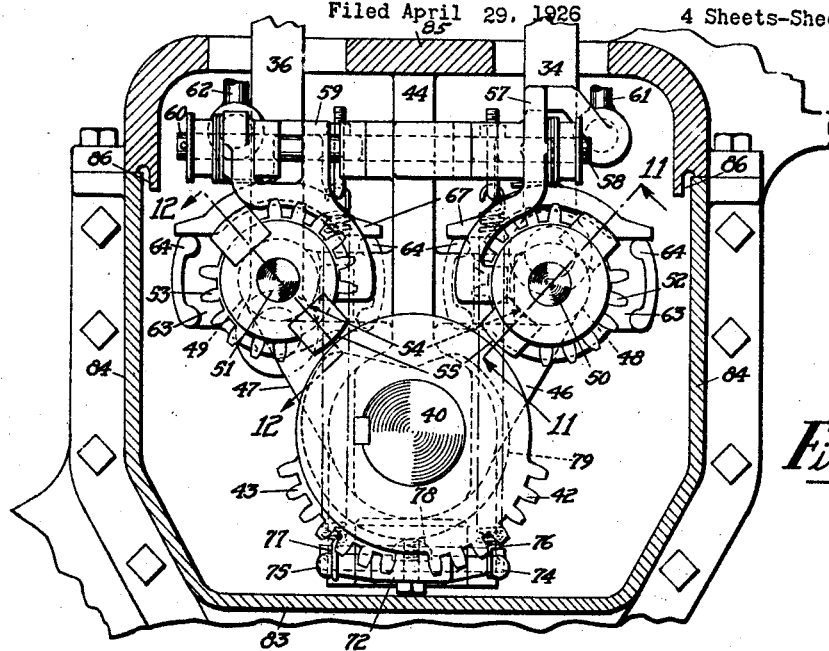
Figure 3:
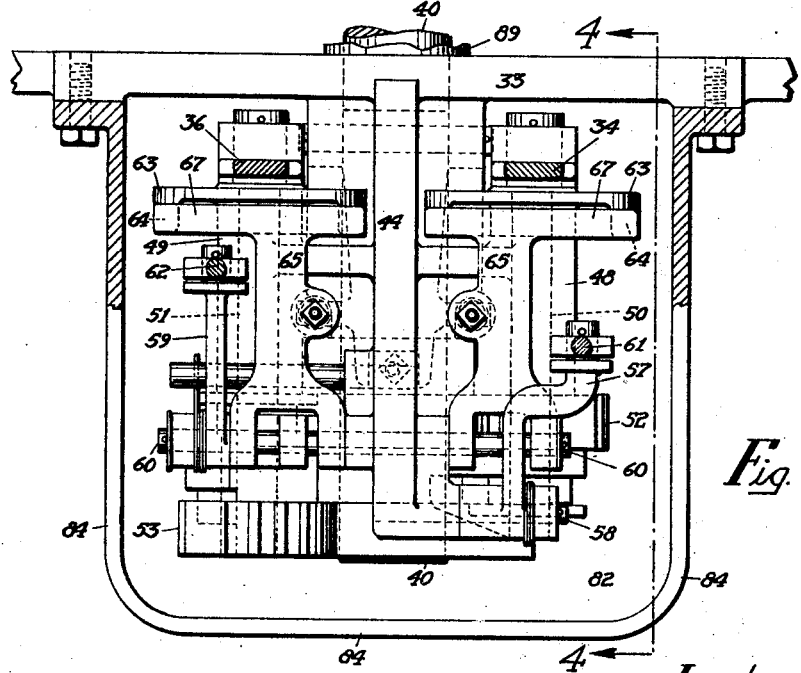
Figure 4:
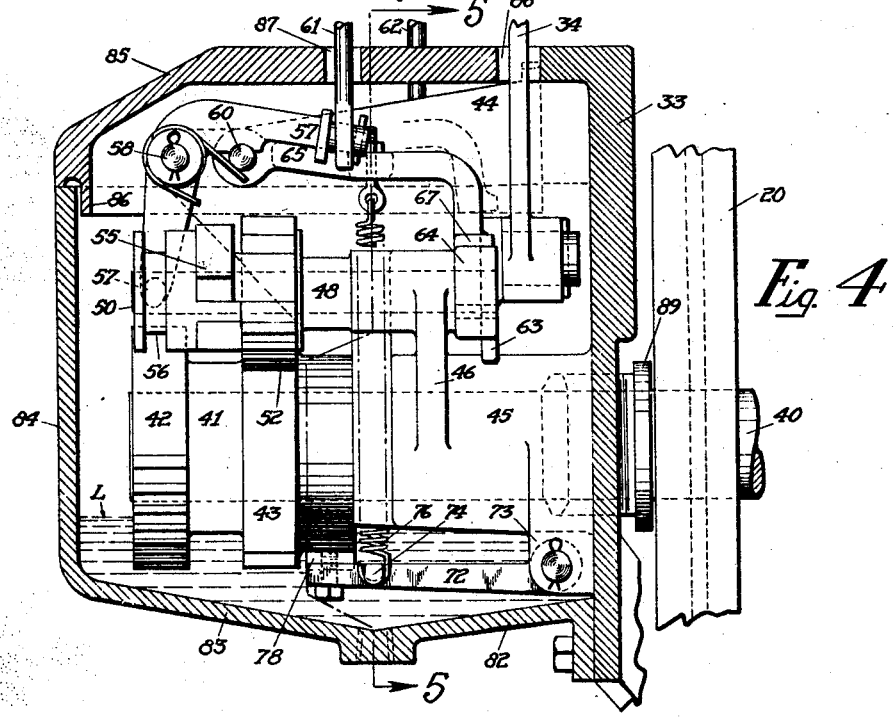
Figure 5:
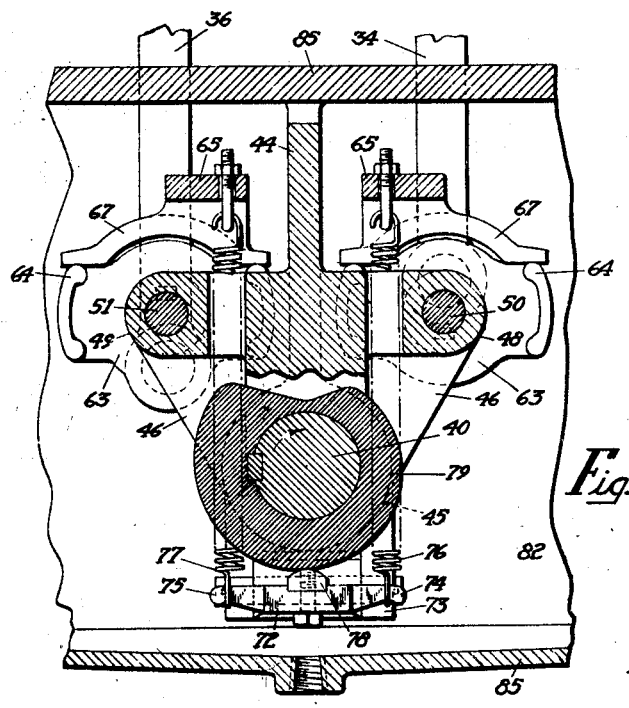
Figure 6:
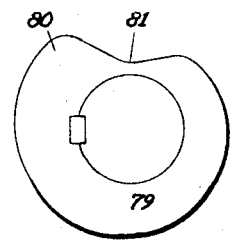
Figure 10:
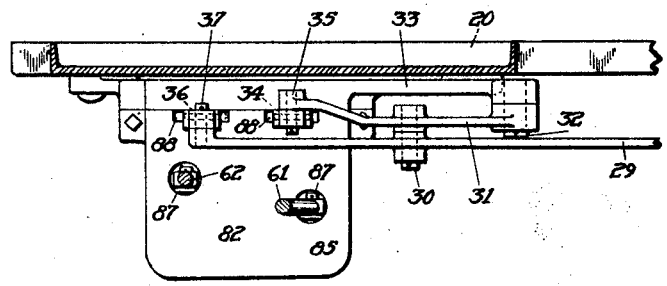
Figure 11:
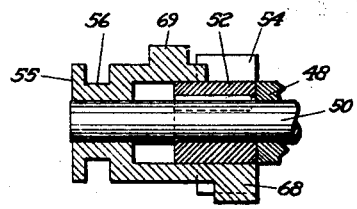
Figure 12:
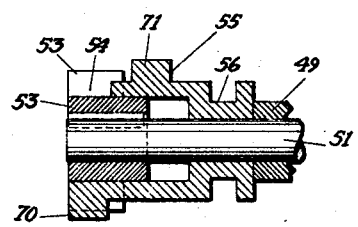

In the accompanying drawings wherein I have shown a convenient embodiment of my invention, Fig. 1 is a side elevation of a loom having my invention applied thereto and showing the same as applied to a four box loom, Fig. 2 is an enlarged end view of the box motion looking in the same direction as Fig. 1 but with the oil case broken away to show the master gear and parts controlled thereby, Fig. 3 is an enlarged top plan view of the box motion looking in the direction of arrow 3, Fig. 1 with the cover removed, Fig. 4 is a vertical section on line 4—4 of Fig. 3, Fig. 5 is a vertical section on line 5—5 of Fig. 4, Fig. 6 is a detail view of the cam secured to the bottom shaft and operating the auxiliary lever located at the bottom of the motion, Figs. 7, 8, and 9 are diagrammatic views of certain parts of the box motion showing the relation of the cam shown in Fig. 6 with respect thereto in successive positions of the box motion, Fig. 10 is a horizontal section taken on line 10—10 of Fig. 1, and Figs. 11 and 12 are detail sections on lines 11—11 and 12—12 of Fig. 2, respectively.

Referring more particularly to Fig. 1 it will be seen that I have provided a loom frame 20 having a lay 21 provided with a plurality of drop boxes 22 which are supported by a box rod 23 the lower end of which passes through a rocker iron 24 mounted on rocker shaft 25. The box rod has connected thereto as at 26 the lower end of a yielding connector 27 attached as at 28 to a box lever 29. Said box lever is pivotally connected as at 30 to a shorter lever 31 pivoted as at 32 to the upper end of a frame 33 to be described more in detail hereinafter. A depending link 34 is pivotally connected as at 35 to lever 31 and a second link 36 is pivotally connected as at 37 to the box lever 29, said links 34 and 36 being raised and lowered to give the box lever, and hence the boxes, four different positions.

The bottom shaft 40 is extended beyond the loom frame 20 and has keyed to the outer end thereof a master gear 41 having outer and inner segments 42 and 43, respectively, of gear teeth. The frame 33 has extending laterally therefrom a web 44 the lower portion of which merges with a bearing 45 through which the bottom shaft 40 extends.

Arms 46 and 47 extend upwardly, forwardly, and rearwardly, respectively, from the hub 45 and are provided with bearing portions 48 and 49, respectively, through which extend short shafts 50 and 51. Pinions 52 and 53 are secured to the shafts 50 and 51, respectively, each of said pinions being provided with diametrically opposite slots 54, as shown in Figs. 2, 11, and 12. There is associated with each pinion a sliding member 55 grooved as at 56. A lever 57 is pivoted on pin 58 supported by web 44 and cooperates with the sliding member associated with pinion 52, while a second lever 59 is pivoted on pin 60 and cooperates with the sliding member for pinion 53, said levers 57 and 59 having substantially horizontal arms which are attached to lifting rods 61 and 62, respectively, said arms being purposely made long enough to extend beyond the plane of the segments 42 and 43 for a purpose which will appear hereinafter.

Each of the shafts 50 and 51 has keyed thereto a crank plate 63 having aligning pins 64 which cooperate with a locking lever 65 pivoted on pin 60 and having feet 67 to engage the pins 64 to position the pinions correctly. The crank plate which corresponds to shaft 50 has connected thereto the link 34 while the crank plate corresponding to shaft 51 is connected to link 36. As shown in Fig. 11 the sliding member 55 corresponding to pinion 52 is provided with long and short starting teeth 68 and 69, respectively, while the sliding member corresponding to pinion 53 has similar long and short starting teeth 70 and 71, respectively, as shown in Fig. 12. The teeth 68 and 69 cooperate with segment 43 while the teeth 70 and 71 will be actuated by the segment 42. As the levers 57 and 59 rock on their pivots the relative positions of the starting teeth with regard to their corresponding segments will be changed so that as the master gear 41 rotates one or both of the pinions will be rotated if a movement of lever 29 is desired or the levers 57 and 59 will be unchanged if it is desired to keep the box lever in the same position for successive picks. The operation of this form of box motion is well known and for further description of the construction and operation reference may be had to Patent No. 364,697.

In carrying my invention into effect I pivot an auxiliary lever 72 in a depending extension 73 of the bearing 45 and provide said lever with oppositely extending fingers 74 and 75, respectively, which are notched to receive the lower ends of tension springs 76 and 77, the upper ends of which are adjustably connected to locking levers 65 as shown in Fig. 5. Said lever 72 is provided with a shoe 78 which is held in contact with a cam 79 by the springs 76 and 77. Said cam is keyed to the bottom shaft and lies between the master gear 41 and the bearing 45 as shown in Figs. 4, 5, and 6, and is provided with a high point 80 and a low point 81 which together with the remainder of the cam cooperate with shoe 78 to give the lever 72 and the springs 76 and 77 a rising and falling movement as the loom operates.

The operation of the cam and parts controlled thereby is set forth diagrammatically in Figs. 7, 8, and 9. In Fig. 7 the parts are shown in the position they assume just prior to the engagement of one of the segments with its corresponding pinion, the cam moving in the direction indicated by the arrow. Immediately after arriving in the position shown in Fig. 7 the shoe will travel toward the low point 81 to the position shown in Fig. 8, thus relieving tension of the springs 76 and 77 just at the time when the crank plates 63 start their rotation. In this way the pressure of lock levers 65 is reduced during the movement of the pinion but the high point 80 of the cam is so placed that the lever 72 is depressed quickly just prior to the end of the rotary movement of the pinion so that an increased pressure is brought to bear on the pins 64 of the cam plate 63 to prevent excess movement of the pinions as indicated in Fig. 9. As the bottom shaft continues to rotate the lever is gradually raised by the spiral formation of the cam until the shoe again appears in the position shown in Fig. 7 two picks later.

In providing for the lubrication of the box motion hereinbefore described I bolt an oil box or case 82 to the frame 33, said box having a bottom 83 inclined as indicated in Fig. 4 with provision for draining and having vertical walls 84. A cover 85 rests on the top of the walls as shown in Figs. 2 and 4 and has a depending flange 86 extending inside the walls 84, said cover having openings 87 for the box lifter rods located to one side of the plane of the master gear and said cover is recessed as at 88, see Fig. 10, to permit the passage therethrough of the links 34 and 36. The cover rests on the box of its own weight and is held against displacement by the flange 86. The wall 33 has extending therethrough an oil-tight bushing 89 through which the bottom shaft 40 extends, said bushing being threaded into the bearing 45 and preventing leakage of oil.

As shown in Fig. 4 the bottom of the box may be provided with oil to the level indicated at L, the oil being sufficiently high so that as the segments 42 and 43 rotate they will be immersed in the oil to splash the same and carry some of the latter into engagement with the pinions when the boxes are to change. The lever 72 is also located so that when it is depressed quickly by the high point 80 of the cam 79 it will splash the oil and thus provide for lubrication of the parts.

The cam shown in Fig. 6 possesses an advantage not found in the cams shown in my prior Patent No. 764,888 in that the springs 76 and 77 shown herein move upwardly bodily when the shoe is approaching the low part 81 of the cam. During this movement the spirngs are under a normal tension sufficient to prevent undue movement of the pinions, and this normal tension is preserved by having both ends of the springs raised, thus avoiding additional stressing of the springs and locking levers due to lifting of the latter by the pins 64 when the pinions are turning. This feature is absent in my aforesaid patent.

From the foregoing it will be seen that I have provided a box motion the actuating parts of which are located in an oil box or case and that oil is located in the case to a depth sufficient to cause splashing when the segments of the master gear are in the lower part of their movement, the teeth of the segments carrying some of the oil upwardly and onto the pinions and adjacent parts. It will be seen that the openings in the cover for the lifter rods are out of alignment with the planes in which the segments rotate so that oil cannot fly out through said openings. From an inspection of Fig. 10 it will be noted that the links which are controlled by the pinions and operatively connected to the system of compound levers pass through the top of the case along the line of division between the box and the cover so that the latter can be removed without disturbing said links 34 and 36. Furthermore, it will be seen that the lever which controls the springs 76 and 77 is given a sudden downward movement by the point 80 of cam 79, said lever moving into the oil by the motion of the cam to cause agitation of the oil in addition to that caused by the master gear. Reference to Fig. 4 will also show that the inner wall of the case is provided with an oil-tight bearing through which the bottom shaft extends. It will further be noted that the locking levers are independently movable, each being stressed by its spring, and that said springs are mounted on the locking and cam levers and serve to check the pinions without the use of a third spring as is the case in my aforesaid patent.

Having thus described my invention it will be apparent that changes and modifications may be made therein by those skilled in the art without departing from the spirit and scope of the invention, and I do not wish to be limited to the details herein disclosed, but

What I claim is:

1. In a drop box loom, a constantly rotating member, a pinion to be actuated by the member, a locking lever to position said pinion at the end of the movement thereof, a control lever for the locking lever mounted independently thereof, resilient means located between the control and locking levers, an oil casing enclosing the member, pinion, and levers, and means to give said control lever a periodic downward movement into the oil contained in the casing to agitate the oil for the purpose of lubricating the parts contained in the casing.

2. In a box motion for looms, a regularly moving actuating member, a box controlling element to be actuated thereby, a cam moving with the member, a pair of levers one to cooperate with the cam and one to check the element, and resilient means connecting said levers and tending to hold one lever against the cam and the other lever in checking relation with the element.

3. In a box motion for looms, a regularly moving actuating member, a box controlling element to be actuated thereby, a cam moving with the member, a pair of levers one to cooperate with the cam and one to check the element, and resilient means connecting said levers, said levers having independent pivotal supports.

4. In a box motion for looms, a regularly moving actuating member, an element operatively connected to the box motion to be actuated by the member, a locking lever to cooperate with the element, a cam moving with the member, a cam lever supported independently of the locking lever to cooperate with the cam, and resilient means connecting said levers.

5. In a loom box motion having an actuating member, a rotatable element to cooperate with the member and be given angular movements thereby, a cam moving in timed relation with the member, and a pair of resiliently connected levers lying on opposite sides of the cam, one of said levers to cooperate with the element to resist movement thereof and the other of said levers to cooperate with the cam, said levers moving together under influence of the cam to offer light resistance to the element at the beginning of an angular movement of the latter and said levers moving in opposite directions as the element nears the end of an angular movement to offer increased resistance to the movement of the element.

6. In a loom box motion having an actuating member, a rotatable element forming part of the box motion, a lock lever to cooperate with the element and movable by the latter as the same rotates, a control member for said lock lever operatively connected to the latter, and means to cause said lock lever and control member to move in the same direction at the beginning of an angular movement of the element and to move in opposite directions to stress the lock lever as the element nears the end of its angular movement.

7. In a loom box motion having an actuating member, a rotatable element forming part of the box motion, a lock lever to cooperate with the element and movable by the latter as the same rotates, a control member for the lock lever, resilient means interposed between the lock lever and the control member and tending to draw said parts together, and means moving in timed relation with the actuating member and operatively related to the control member causing said lock lever, control member and resilient means to go in the same direction at the beginning of an angular movement of the element and causing said lock lever and controlling member to move in opposite directions to stress the resilient means as the element nears the end of its angular movement.

8. In a loom box motion having an actuating member, a rotatable element forming part of the box motion, a lock lever to cooperate with the element and movable by the latter as the same rotates, a control member resiliently connected to the locking lever, and means acting in timed relation with the actuating member to cause said lock lever and control member to move in the same direction at the beginning of an angular movement of the rotatable element and to move in opposite directions to stress the locking lever as the rotatable element nears the end of an angular movement.

9. In a loom box motion having a rotating actuating member and an angularly movable element forming part of a box motion and being given angular movements by the actuating member, a pair of independently movable devices resiliently connected together, one of said devices serving to resist movement of the rotatable element, and means to cause said devices to move in the same direction at the beginning of an angular movement of the rotatable element and to move in opposite directions to resist movement of the rotatable element as the latter nears the end of its angular movement.

10. In a loom box motion having a rotating actuating member and an angularly movable element forming part of a box motion and being given angular movements by the actuating member, a pair of resiliently connected independently movable devices, one of said devices being operatively related to the rotatable element to resist movement thereof, a cam moving in timed relation with the actuating member and being operatively related to the other of said devices, said cam having a portion to cooperate with said other device whereby the latter moves in the same direction as the first named device at the beginning of an angular movement of the rotating element and said cam having another surface to cooperate with the said other device whereby said devices will move in opposite directions to resist movement of the rotatable element when the latter nears the end of its angular movement.

11. In a loom box motion having a rotating actuating member and an angularly movable element forming part of a box motion and being given angular movements by the actuating member, a device to cooperate with the rotatable element to resist angular movement thereof and movable by said element as the latter starts an angular movement, a second device operatively connected to the first device and capable of increasing the resistant force of the first named device exerted on said rotatable element, and means moving in timed relation with the actuating member to cause said devices to move together at the beginning of an angular movement of the rotatable element to exert a relatively light resistant force on said element and to cause said devices to change their relative movements as the element nears the end of an angular movement to exert a relatively large resistant force to the movement of said element.

12. In a loom box motion having a rotating actuating member and an angularly movable element forming part of a box motion and being given angular movements by the actuating member, a lock lever to be operatively related to the element and to resist movement thereof and to be moved thereby as said element begins an angular movement, a second device resiliently connected to the first device, a cam moving in timed relation with the actuating member and operatively related to the second named device, said cam having a dwell portion and having also high and low portions relatively to the dwell portion, said low portion being presented to the second named device as the rotatable element begins an angular movement and said high portion being presented to said second device as the rotatable element nears the end of an angular movement.

In testimony whereof I have hereunto affixed my signature.

ALBERT A. GORDON